(12) United States Patent
Dotan, III et al.

(10) Patent No.: US 8,839,449 B1
(45) Date of Patent: Sep. 16, 2014

(54) ASSESSING RISK OF INFORMATION LEAKAGE

(71) Applicant: EMC Corporation, Hopkinton, MA (US)

(72) Inventors: Yedidya Dotan, III, Newton, MA (US); Yael Villa, Tel Aviv (IL); Ann S. Johnson, Monmouth Beach, NJ (US)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 13/720,428

(22) Filed: Dec. 19, 2012

(51) Int. Cl.
*G06F 7/04* (2006.01)
*G06F 21/60* (2013.01)

(52) U.S. Cl.
CPC ..................... *G06F 21/60* (2013.01)
USPC ............................ 726/26; 713/189

(58) Field of Classification Search
CPC .............. G06F 21/10; G11B 20/00086; G11B 20/0021; H04L 63/0428
See application file for complete search history.

(56) References Cited

U.S. PATENT DOCUMENTS

| | | | |
|---|---|---|---|
| 7,490,356 B2 * | 2/2009 | Lieblich et al. | 726/25 |
| 7,865,958 B2 * | 1/2011 | Lieblich et al. | 726/25 |
| 8,478,708 B1 * | 7/2013 | Larcom | 706/52 |
| 8,595,844 B2 * | 11/2013 | Bahl | 726/25 |
| 2009/0099960 A1 * | 4/2009 | Robida et al. | 705/38 |
| 2013/0298256 A1 * | 11/2013 | Barnes et al. | 726/26 |

\* cited by examiner

*Primary Examiner* — Fikremariam A Yalew
(74) *Attorney, Agent, or Firm* — Krishnendu Gupta; Jason A. Reyes

(57) ABSTRACT

There is disclosed a technique for use in assessing the risk of information leakage. The technique receives a set of facts that have references to individuals associated with an organization. Based on the received facts, a link is detected between an individual associated with the organization and an occurrence indicative of risk. A connection is identified between the individual and confidential information within the organization. Based on the detected link and the identified connection, the risk is determined of the confidential information being leaked in an unauthorized manner by the individual.

18 Claims, 8 Drawing Sheets

72

| | A | B | C | D |
|---|---|---|---|---|
| FACT 1 | YES | YES | NO | NO |
| FACT 2 | NO | YES | NO | NO |
| FACT 3 | YES | YES | YES | NO |
| FACT 4 | YES | NO | NO | YES |

74

| | INTERNAL LINK STRENGTH (75) | EXTERNAL LINK STRENGTH (76) |
|---|---|---|
| FACT 1 | 2 | 0 |
| | | |
| FACT 3 | 3 | 0 |
| FACT 4 | 1 | 1 |

FIG. 4

ASSESSING RISK OF INFORMATION LEAKAGE

TECHNICAL FIELD

The present invention relates to assessing the risk of information leakage, and more particularly to assessing the risk of information leakage from an organization.

BACKGROUND OF THE INVENTION

The leakage of sensitive confidential information can be extremely costly to an organization in both monetary and reputational terms. Conventionally, the risk of information leakage emanated from outside sources seeking to hack into the organization with a view to enriching themselves and/or damaging the organization. This is no longer the only risk of leakage.

The risk of internal employees leaking the information in an unauthorized manner is increasing. However, the difficulty for many organizations is that most employees are loyal so having strict security procedures can often lead to further problems. For example, the use of polygraphs and/or random checks can negatively affect morale and relationships within the organization. This is undesirable.

SUMMARY OF THE INVENTION

There is disclosed a technique that in one embodiment is directed to a method for use in assessing the risk of information leakage. The method includes receiving a set of facts that have references to individuals associated with an organization. The method also includes detecting a link between an individual associated with the organization and an occurrence indicative of risk based on the received facts. The method further includes identifying a connection between the individual and confidential information within the organization. The method further includes determining the risk of the confidential information being leaked in an unauthorized manner by the individual based on the detected link and the identified connection.

Additionally, some embodiments of the technique are directed to a system for use in assessing the risk of information leakage. The system includes a network interface, memory and controller including controlling circuitry, the controlling circuitry being constructed and arranged to carry out the method of assessing the risk of information leakage.

Furthermore, some embodiments of the improved technique are directed to a computer program product having a non-transitory computer readable storage medium which stores code including a set of instructions to carry out the method of assessing the risk of information leakage.

BRIEF DESCRIPTION OF THE DRAWING

Features and advantages of the present invention will become more apparent from the following detailed description of exemplary embodiments thereof taken in conjunction with the accompanying drawings in which:

FIG. 4 is a block diagram illustrating an example of a table of links between individuals and facts in the database within the database server shown in FIG. 2(b).

DETAILED DESCRIPTION

The invention can be implemented in numerous ways, including as a process, an apparatus, a system, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

There is described below a technique for use in assessing the risk of information leakage. It should be understood that in at least some embodiments a risk engine can determine the risk of an employee leaking information based on at least one risk factor. For example, the risk factors can include financial difficulties associated with the employee or a relative of the employee, unlawful activity associated with the employee or a relative of the employee, an association between the employee and a known fraud case, a fraudulent closed net communication pattern, employee access to high value data and the like. In at least some of the embodiments, these risk factors can be mapped using link analysis and access to public data records such as LexisNexis® and credit rating companies.

Figure 1:
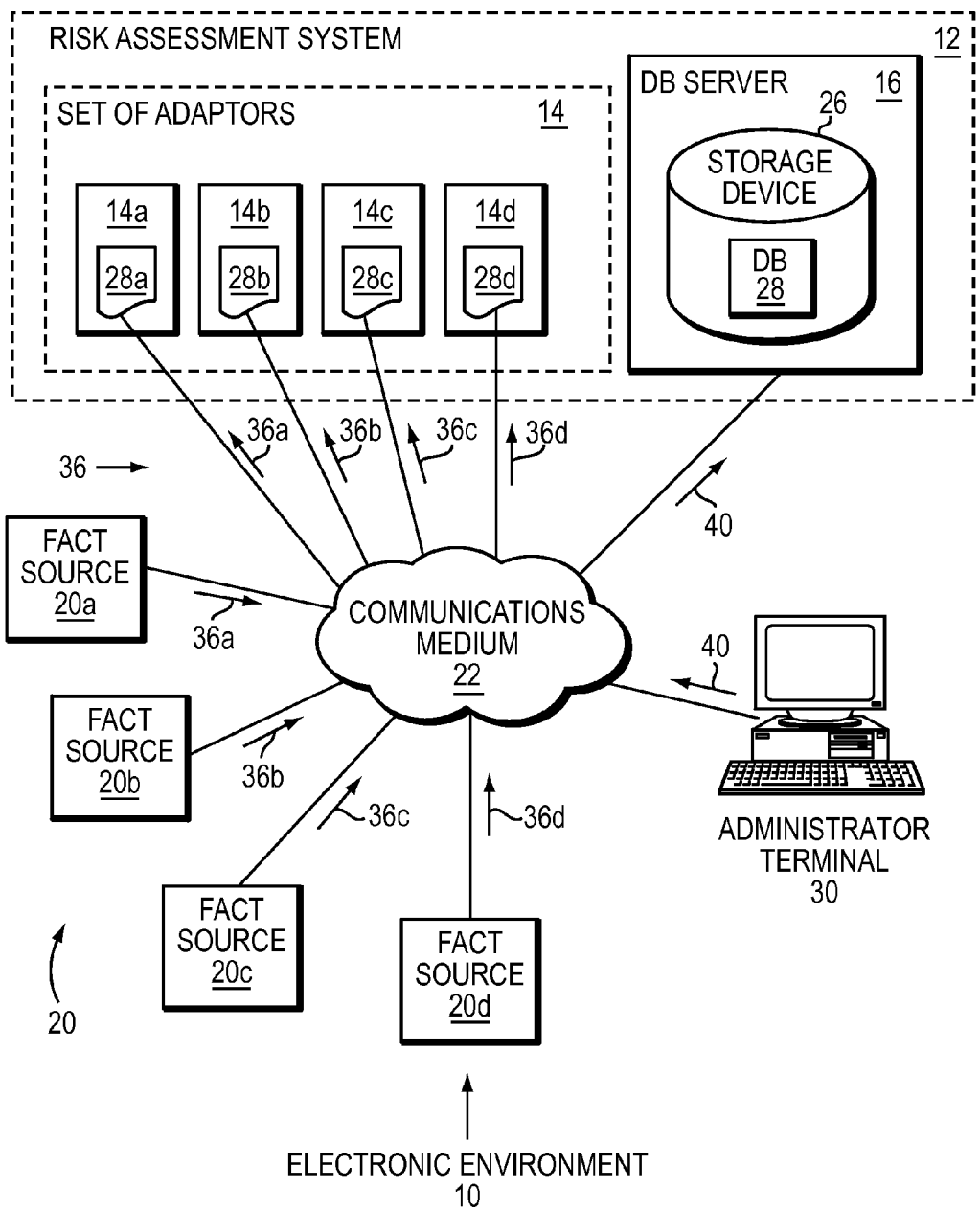
FIG. 1 is a block diagram illustrating an example electronic environment for carrying out the technique.

Referring to FIG. 1, there is illustrated an electronic environment 10 for carrying out the technique. The electronic environment 10 includes a risk assessment system 12, fact sources 20, an administrator terminal 30 and communications medium 22.

The communication medium 22 provides network connections between the risk assessment system 12, the fact sources 20 and the administrator terminal 30. The communications medium 22 may implement a variety of protocols such as TCP/IP, UDP, ATM, Ethernet, Fibre Channel, combinations thereof, and the like. Furthermore, communications media 22 may include various components (e.g., cables, switches/routers, gateways/bridges, NAS/SAN appliances/nodes, interfaces, etc.). Moreover, the communications medium 22 are capable of having a variety of topologies (e.g., queue manager-and-spoke, ring, backbone, multi drop, point to-point, irregular, combinations thereof, and so on).

The fact sources 20 include various databases 20a, 20b, 20c and 20d in communication with the risk assessment system 12. In some arrangements, some or all of the fact sources 20 are remote from the risk assessment system 12. In other arrangements, some or all of the fact sources 20 are in the same location as the risk assessment system 12.

It should be understood that in at least some embodiment the fact source 20a can be a Microsoft Exchange® server, the fact source 20b can be an IBM Lotus Domino® server, the fact source 20c can be an SAP server and the fact source 20d can be a LexisNexis® server. It should also be understood that facts 36a can be contained in emails, facts 36b can be contained in calendar entries, facts 36c can be contained in expense reports and facts 36d can be contained in legal and public records. The facts 36a, 36b, 36c and 36d each possess formatting defined by their respective fact source. For example, the facts 36a can be formatted according to the email formatting (e.g., MIME, plain type, HTML, etc.), the facts 36b can be formatted according to conventions used by Lotus Notes® for storing calendar data, the facts 36c can be formatted according to how SAP treats expense report data and the facts 36d can be formatted according to the formatting used by LexisNexis®.

The risk assessment system 12 includes a set of adaptors 14 and a database server 16. The database server 16 is an electronic system in communication with the set of adaptors 14. The database server 16 includes a storage device 26 on which a database 28 is stored. The database 28 is a database which stores facts in a common format with each entry in the database representing a fact. The common format is represented by various fields within each entry. In some arrangements, the database 28 is a relational database. In other arrangements, the database 28 is a NoSQL database.

The set of adaptors 14 includes adaptors 14a, 14b, 14c and 14d (adaptors 14) for corresponding with fact sources 20a, 20b, 20c, 20d. In some arrangements, the adaptors 14 take the form of specialized hardware connected to the database server 16. In other arrangements, the adaptors 14 take the form of software configured to run on database server 16. In still other arrangements, the adaptors 14 take the form of hardware or software connected to corresponding fact sources 20.

The administrator terminal 30 allows a system administrator to send a request 40 to the risk assessment system 12 requesting an assessment of the risk of information leakage in an unauthorized manner. The request can be for a single employee. The request can also be for a report assessing the risk to an organization of information leakage. For example, the risk assessment system may deliver a report of the most risky employees.

During operation, the fact sources 20 send facts 36 to the adaptors 14 in the risk assessment system 12. In some arrangements, the fact sources 20 send facts 36 to the risk assessment system 12 on a regular basis as part of a subscription. In other arrangements, the fact sources 20 send facts 36 to the risk assessment system 12 in response to a request sent by risk assessment system 12. It should be understood that each adaptor 14 receives the facts 36 from a corresponding fact source and upon receipt of the facts converts the received facts from the fact sources 20 in their respective formats into a common format. The common format is configured to allow the risk assessment system 12 to store all facts 36 together in database 28 independent of the fact source 20 from where the facts 36 originated.

The adaptors 14 when performing the conversion operation scan for data such as keywords, quantities, identifiers and the like within the individual format. Such key data represents values to be stored in an individual entry of database 28 representing a fact 36. In some arrangements, the conversion operation runs on a continuous basis. In other arrangements, the conversion operation runs off-line (e.g., during certain hours of the night when the servers are off-line).

Sometime after the facts are stored in the database 28, the administrator can submit a request 40 to the risk assessment system 12. For example, the request can seek an assessment of the risk of an employee leaking information. The employee may be one of a large population of employees within or associated with an organization.

Upon receiving the request 40, the database server 16 can perform a lookup operation on the database 28 to find facts that have references to the employee. For example, the database server 16 can use an employee identifier in the request 40 to assist in the lookup operation. Facts can include e-mails, calendar entries, expense reports and the like associated with the employee. Additionally, facts can include e-mails, calendar entries, expense reports and the like associated with other employees. Furthermore, facts can include information from public trusted sources.

In this case, the lookup operation performed by the database server 16 can detect a link between an employee and an occurrence indicative of risk based on the received facts. In this case, the facts 36 are stored in a common format in database 28 such that the server 16 can detect the link between the employee and the occurrence indicative of risk. In one embodiment, a public trusted source 20d may provide a fact to be stored in a common format in the database 28 that the employee is associated with risky and/or unlawful behaviour. For example, the occurrence indicative of risk can be the unlawful behaviour. In another embodiment, the public trusted source 20d may provide a fact to be stored in a common format in the database 28 that a relative of the employee is associated with unlawful behaviour. In a further embodiment, the public trusted source 20d may provide a fact to be stored in a common format in the database 28 regarding the credit rating of the employee. For example, the occurrence indicative of risk can be the assignment of a low credit rating to the individual. In a still further embodiment, the sources 20a-20d can provide facts to be stored in a common format in the database 28 that the employee communicated with a fellow employee associated with unlawful behaviour. The occurrence indicative of risk can be the communication with the fellow employee. In another embodiment, the sources 20a-20d can provide facts to be stored in a common format in the database 28 that the employee communicated with a person from another organization that is separate and distinct from the organization with whom the employee is employed. For example, a financial institution comprising a trading business organization and an investment banking organization should to a large extent operate separately in order to avoid conflicts of interest. In this case, the server 16 can detect the communications between employees in separate distinct organizations within the financial institution. The link between the employees in distinct organizations can be detected by the lookup operation by finding e-mails, calendar entries etc linking one employee to another employee in a separate distinct organization within the financial institution. The occurrence indicative of risk for the employee can be the communication with the employee in the other organization.

Additionally, the server 16 can also perform a lookup operation to identify a connection between the employee and confidential information within the organization. For example, the employee can have a high level of seniority within the organization enabling the employee to access highly confidential information. The details with respect to the seniority of the employee can be stored in the database such that the server 16 can identify the connection to confidential information based on the level of seniority. It should be understood that different levels of seniority will be correlated with confidential information such that employees at different levels have access to different levels of sensitive information. For example, the more senior level employees can have greater access to confidential information. However, the junior employees may have access to only very low levels of information. In another example, the employee can be a member of an organizational group having access to confidential information such as the intellectual property group. The details with respect to the organizational group of the employee can also be stored in the database 28 such that the server 16 can identify the connection of the employee to the confidential information based on the group.

As an example, it should be understood that the server 16 can identify a connection between the employee and confidential information within the organization by locating the security classification associated the employee by matching an employee identifier in a request with that in an organization chart. To this effect, in some arrangements, the database can include an organization chart. The organization chart can be a listing of employees in the organization arranged by their place within a hierarchy which is indicative of job grade. For example, an employee holding the title of President or CEO would hold the top place within the hierarchy. Various Vice-Presidents could hold a lower level, while managing directors, middle managers, supervisors and individual contributors would respectively hold still lower levels. To each of these levels, the organization chart can assign a number, e.g., "1" to the top level, "2" to the level below the top, and so on. It should be understood that the higher the level of the employee the greater the connection between the employee and confidential information within the organization.

Furthermore, the server 16 can also identify an indirect connection between the employee and the confidential information within the organization. For example, the server 16 can identify from the facts in the database 28 that the employee communicated with another employee with access to the confidential information. In this case, the fellow employee can be a senior employee with access to the confidential information and the employee can be linked with the confidential information through the senior employee.

In this embodiment, the server 16 can also determine the risk of information leakage in an unauthorized manner by the employee based on the detected link and the identified connection. It should be understood that the database server 16 can compute a risk score using a variety of algorithms.

Figure 2A:
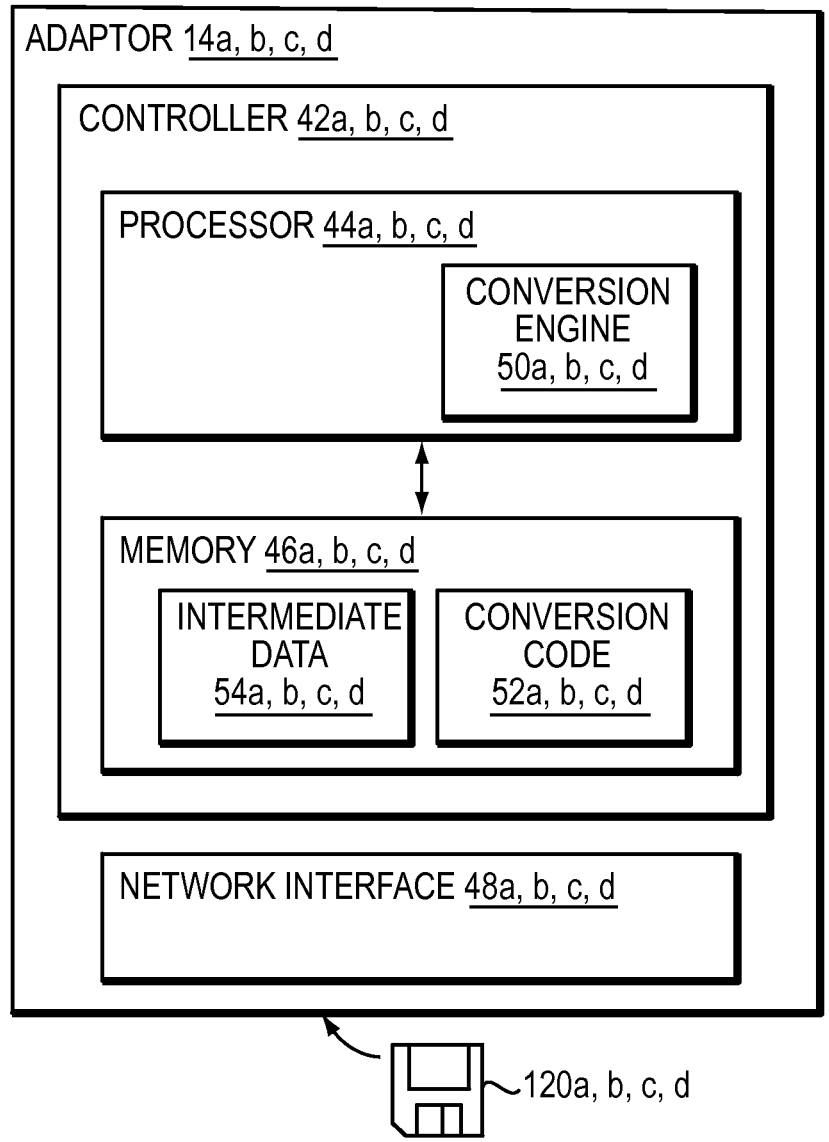
FIG. 2(a) is a block diagram illustrating an example set of adaptors within the electronic environment shown in FIG. 1.
Figure 2B:
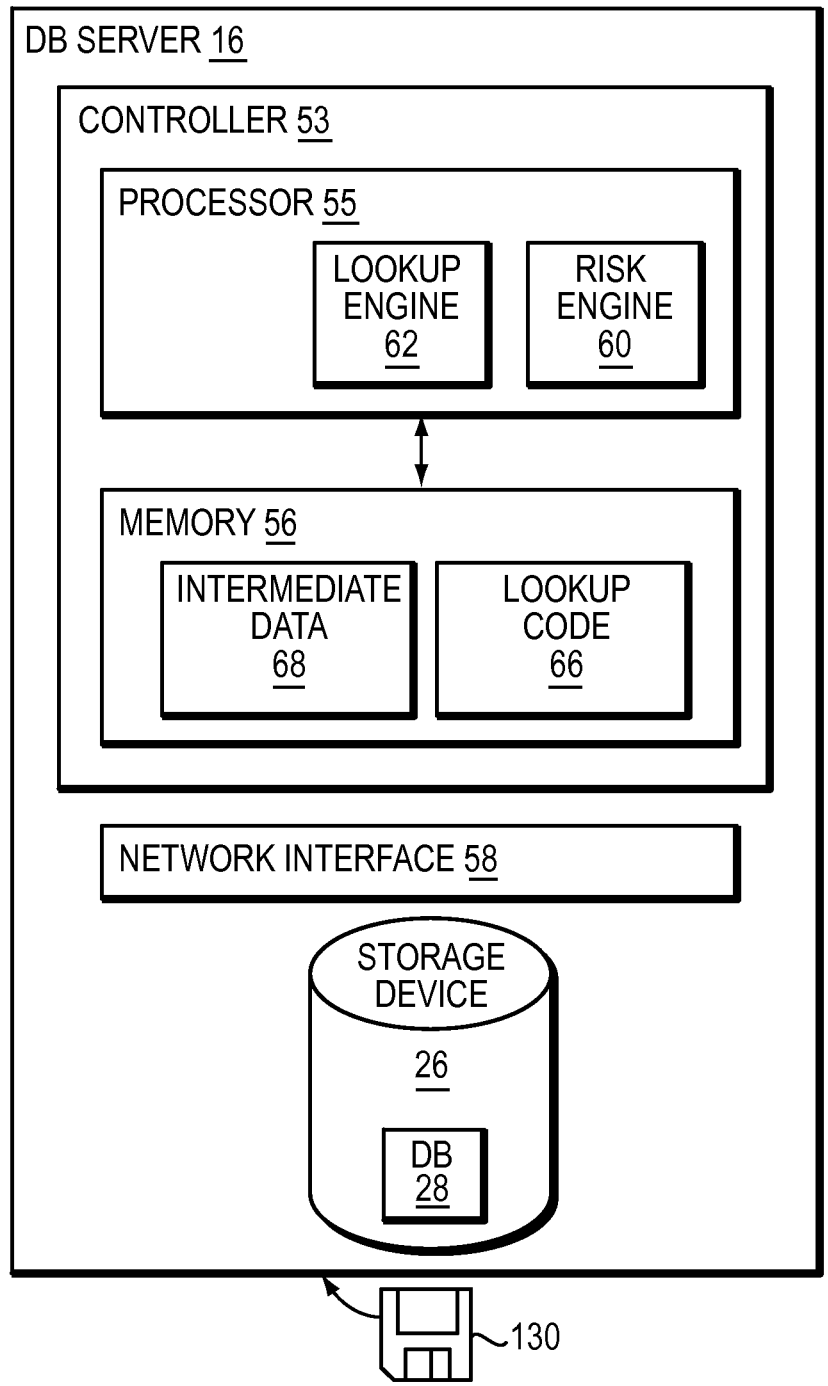
FIG. 2(b) is a block diagram illustrating an example database server within the electronic environment shown in FIG. 1.

Referring to FIG. 2(*a*), there is illustrated further details of the adaptor 14*a* implemented as hardware. The adaptor 14*a* includes a controller 42*a*, which in turn includes a processor 44*a* and a memory 46*a*, and a network interface 48*a*. It will be understood that in discussions herein, the adaptors 14*b*, 14*c* and 14*d* have corresponding components and associated numeral labels which will be referred to as "b", "c", and "d", respectively, in place of "a".

The network interface 48*a* takes the form of an Ethernet card. In some arrangements, the network interface 48*a* takes other forms including a wireless receiver and a token ring card.

In yet other arrangements, it should be appreciated that with the way server farms operate today this could be expanded to FCOE, Infiniband and other high throughput solutions.

The memory 46*a* is configured to store code which includes conversion code 52*a* configured to convert facts 36*a* (see FIG. 1) in a distinct data format with which the fact source 20*a* is associated to the common data format. The memory 46*a* also includes space for intermediate data 54*a* in which intermediate results of the conversion process are stored. The memory 46*a* generally takes the form of, e.g., random access memory, flash memory or a non-volatile memory.

The processor 44*a* takes the form of, but is not limited to, Intel or AMD-based MPUs, and can include a single or multi-cores each running single or multiple threads. The processor 44*a* is coupled to memory 46*a* and is configured to execute instructions from conversion code 52*a*. The processor 44*a* includes conversion engine 50*a*. The conversion engine 50*a* takes the form of hardware configured to convert the facts 36*a* to the common data format. In some arrangements, the engine 50*a* takes the form of a separate appliance connected to database server 16.

Referring to FIG. 2(*b*), there is illustrated in the figure further details of the database server 16. In addition to the storage device 26, the database server 16 includes a controller 53, which in turn includes a processor 55 and a memory 56, and a network interface 58.

The network interface 58 is constructed and arranged to send and receive data over communications medium 22. Specifically, the network interface 58 is configured to receive the request 40 from terminal 30 over communications medium 22 and to send the results of the risk assessment to terminal 30 over the communications medium 12. Also, the network interface 58 is configured to receive facts 36 in common format from the adaptors 14.

The memory 56 is configured to store code which includes lookup code 66 configured to lookup the facts 36 stored in database 28. The memory 56 also includes space for intermediate data 68 in which intermediate results are stored. The memory 56 generally takes the form of random access memory, flash memory or a non-volatile memory.

The processor 55 takes the form of, but is not limited to, Intel or AMD-based MPUs, and can include a single or multi-cores each running single or multiple threads. The processor 55 is coupled to memory 56 and is configured to execute instructions from lookup code 66. The processor 55 includes a lookup engine 62 and a risk engine 60.

During operation, the network interface 48*a* receives facts 36*a* and places data representing facts in space for intermediate data 54*a*. Upon the space for intermediate data 54*a* being filled, the conversion engine 50*a* performs a conversion operation on the data representing facts 36*a*. It should be understood that analogous events occur with respect to facts 36*b*, 36*c* and 36*d* and conversion engines 50*b*, 50*c* and 50*d*.

Upon completion of the conversion operation, the facts 36*a* to 36*d* are stored in a common format in the database 28. This enables the database server 16 to perform lookup operations using the lookup engine 62 to detect a link between an individual associated with the organization and an occurrence indicative of risk. The database server 16 can also identify a connection between the individual and confidential information within the organization as discussed above.

It should be understood that in this embodiment the lookup engine 62 can detect the occurrence indicative of risk. For example, the occurrence indicative of risk may relate to a relative of the employee being associated with fraud. As described above, the data source 50*d* which is a LexisNexis® server can provide access to large amounts of legal and public records. Therefore, the public source 50*d* can provide facts in connection with the employee to be stored in the common format in the database 28. This facilitates the detection of the association between the occurrence indicative of risk and the employee.

It should also be understood that the lookup engine 62 can identify a connection between the individual and confidential information within the organization. For example, the engine 62 can identify in the database 28 the connection between the employee and a fellow employee with access to the confidential information based on the fellow employee's level of seniority and/or the organizational group associated with the fellow employee. On the other hand, the employee may be directly linked to the confidentially information based on level of seniority and/or the organizational group associated with the employee. For example, the employee may be a senior employee with access to highly confidential information. The engine 62 can identify this direct link to the confidential information by identifying the employee's level in an organization chart in the database 28.

The results of the lookup operation are stored in intermediate data 68 such that the risk engine 60 can determine the risk of the confidential information being leaked in an unauthorized manner by the employee. The risk score will be based on detecting a link between an individual associated with the organization and an occurrence indicative of risk as well as identifying a connection between the individual and confidential information within the organization. The determined riskiness of the employee can be communicated to the terminal 30 in order to alert the administrator of the risk.

Figure 3:
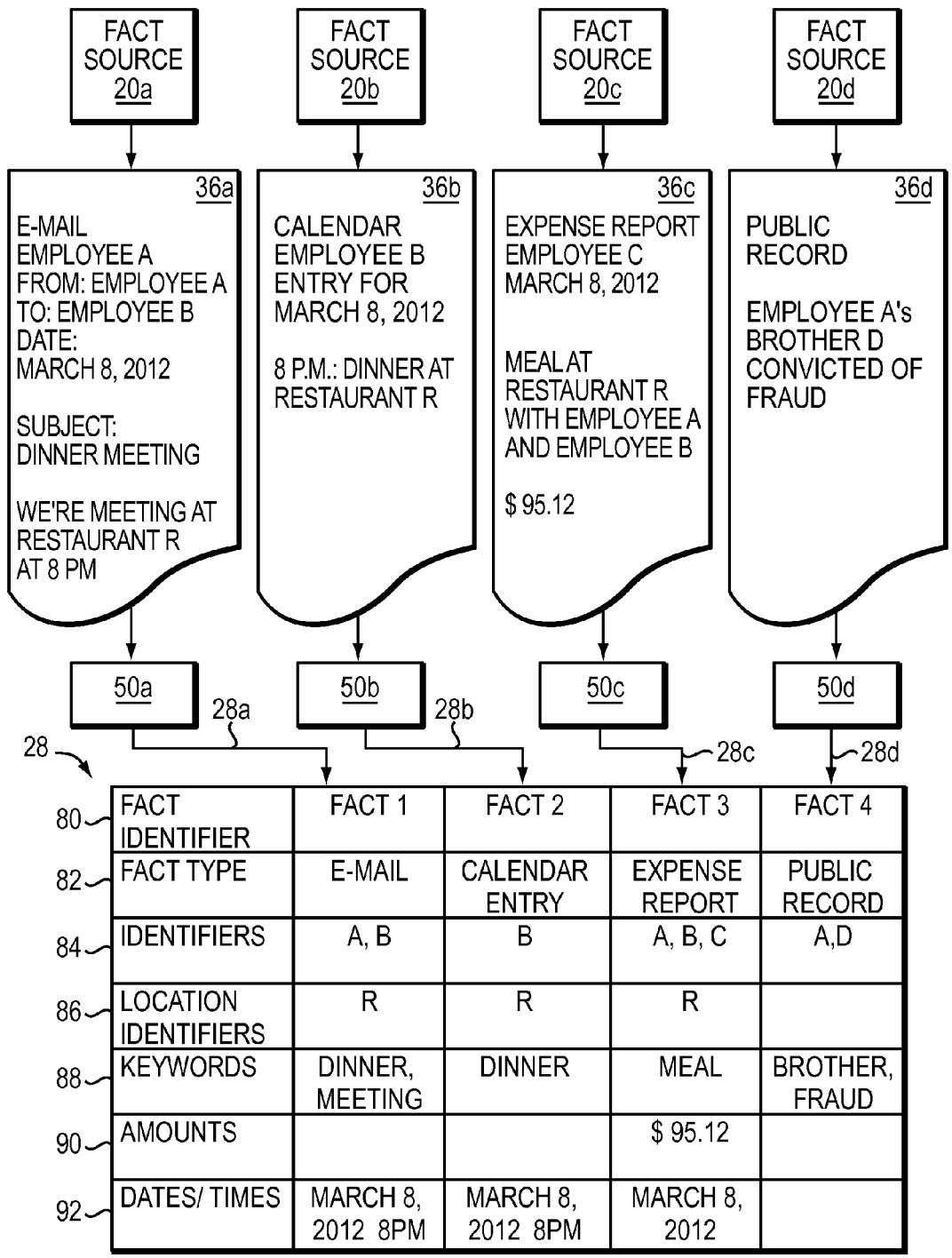
FIG. 3 is a block diagram illustrating an example of the adaptors shown in FIG. 2(a) converting facts into a common format such that the facts can be stored in the common format in a database in the database server shown in FIG. 2(b).
Figure 5A:
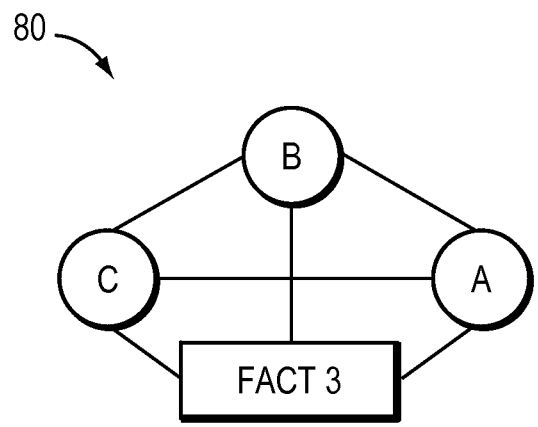
FIG. 5(a) to (d) is a block diagram illustrating example graphs representing relationships between individuals for a selected fact in the database within the database server shown in FIG. 2(b).
Figure 5B:
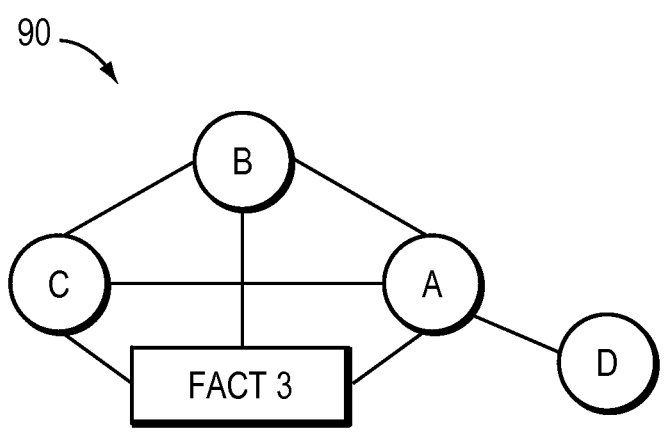
Figure 5C:
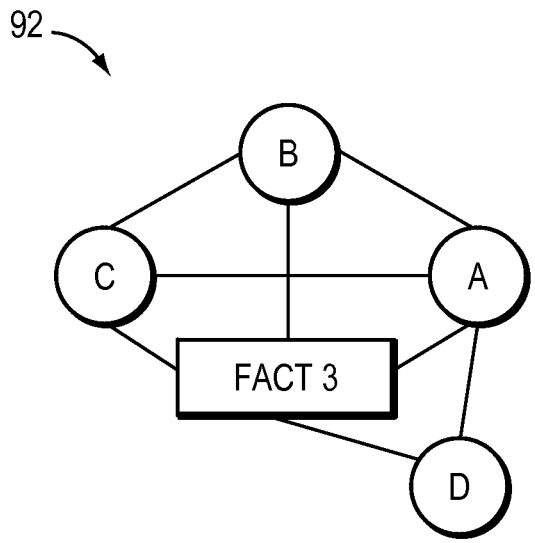
Figure 5D:
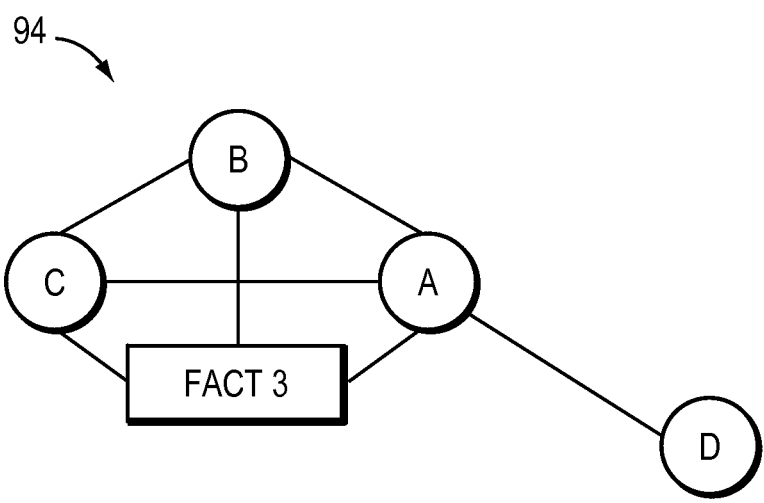

Referring to FIG. 3, there is illustrated an example conversion operation performed by the conversion engines 50*a*, 50*b*, 50*c* and 50*d* for adaptors 14*a*, 14*b*, 14*c* and 14*d*. In this case, the fact source 20*a* is a Microsoft Exchange® server, the fact source 20*b* is an IBM Lotus Domino® server, the fact source 20*c* is a SAP server and the fact source 20*d* is a LexisNexis® server. Additionally, the facts 36*a* are contained in emails, the facts 36*b* are contained in calendar entries, the facts 36*c* are contained in expense reports and the facts 36*d* are contained in public records.

It should be understood that the email 36*a* belongs to employee A and refers to an email sent to an employee having an identifier B from the employee having the identifier A. The e-mail 36*a* having a subject "Dinner Meeting" was sent on Mar. 8, 2012. The body of the email 36*a* details a meeting taking place at Restaurant R at 8 PM. Because there is no other keywords (e.g., "tomorrow," "Friday," etc.) present in the body of the email 36*a*, the meeting is assumed to be a dinner meeting at 8 PM on Mar. 8, 2012.

Additionally, it should be understood that the calendar entry 36*b* belongs to the employee having identifier B. The calendar entry refers to a dinner at Restaurant R at 8 PM on Mar. 8, 2012.

Furthermore, it should be understood that the expense report 36*c* belongs to the employee having identifier C. The report refers to a meal on Mar. 8, 2012 with employees A and B at Restaurant R. The cost of the meal was $95.12.

Moreover, it should be understood that the public record 36*d* refers to the employee A being related to a fraud convict. It should be appreciated from the figure that in this embodiment the employee A has a brother identified as D that was convicted of fraud.

The conversion engines 50*a*, 50*b*, 50*c* and 50*d* extract key information from each of the respective facts 36*a*, 36*b*, 36*c* and 36*d* and places this information in various fields within corresponding entries within database 28. How each conversion engine 50 will place information in the database 28 will depend on the formatting of the corresponding facts 36. For example, the conversion engine 50*a* extracts the values of the fields in the "To:", "From:", "Date:" and "Subject:" lines of email 36*a*. In addition, the conversion engine 50*a* searches the body of email 36*a* for various keywords (e.g., "Restaurant R", "8 PM"). The conversion engine 50*b*, on the other hand, extracts the owner (Employee B), date (Mar. 8, 2012) and time (8 PM) as well as keywords from the description of the event including the keyword "Dinner" and the location at "Restaurant R". The conversion engine 50*c* extracts the owner (Employee C), the event type ("Meal"), a location ("Restaurant R") and an amount ($95.12) as well as keywords in description of the expense event (e.g., "Meal", "Employee A" and "Employee B"). The conversion event 50*d* extracts the identity of "Employee A" as well as the identity of "D" in addition to the keywords "Brother" and "Fraud".

The conversion engines 50*a*, 50*b*, 50*c* and 50*d* place the respective extracted data into database entries 28*a*, 28*b*, 28*c* and 28*d*. It should be understood that each database entry 28*a*, 28*b*, 28*c* and 28*d* has various fields corresponding to the extracted data. For example, a fact identifier 80, a fact type 82, an identifier 84, a location identifier 86, keywords 88, money amounts 90 and dates/times 92. The data in database 28 represents the facts 36 in a common format such that data is ready to be processed.

Referring to FIG. 4, there is illustrated some tables representing results of the lookup process stored in memory 56. It should be understood that in this embodiment the lookup operation is performed in response to a request 40 for an assessment of the risk of information leakage in connection with employee A. Table 72 is a link table representing a table of references, or links, between facts 36 and employees A, B and C as well as employee A's brother D that was convicted of fraud. It will be understood that Fact 2 has been filtered out, as represented by the shading, because this particular fact has no reference to employee A. Table 74 is a link strength table representing link strengths between facts 36 and employee's A, B and C as well as employee A's brother D.

The link table 72 represents the relationship between facts 36, employees A to C and employee A's brother D. As discussed above, Fact 2 has been filtered out. For the other facts 36, link table 72 shows whether there is a reference to each employee A, B and C and individual D. For example, Fact 1 has references to employee A and B but no reference to employee C and neither is there a reference to individual D.

The link strength table 74 represents link strengths between facts 36 and employee's A, B and C as well as employee A's brother D. As discussed above, there is no reference to Fact 2 as this particular fact has no reference to employee A. Specifically, the link strength table 74 includes fields for an internal link strength 75, which refers to internal employees within organization referred to by a fact (i.e. employees A to C), and an external link strength 76, which refers to external individuals outside organization referred to by a fact (i.e. individual D). To continue the example above, Fact 1 has an internal link strength of 2 (employee A and B have a reference in Fact 1) and an external link strength of 0 (no external individuals have a reference in Fact 1). Fact 3 has an internal link strength of 3 (employee A, B and C have a reference in Fact 3) and an external link strength of 0 (no external individuals have a reference in Fact 3). Fact 4 has an internal link strength of 1 (employee A has a reference in Fact 4) and an external link strength of 1 (individual D has a reference in Fact 4).

The database server 16 uses link strength table 74 in detecting an association between employee and the occurrence indicative if risk. Along these lines, the database server 16 favors entries in link strength table 74 that have a large value of external link strength 76 for detecting the associated with the occurrence indicative of risk.

Additionally, the database server 16 can favor entries in link strength table 74 that have a large value of internal link strength 75 for identifying a connection between the employee and confidential information within the organization. Furthermore, the database server 16 can use details with respect to the level of seniority of the employee etc associated with the employees to identify the connection between the employee and confidential information within the organization. These details are stored in the database 28.

Referring to FIGS. 5(a) to (d), there is illustrated graphs 80, 90, 92 and 94 which represent example relationship details that follows on from the above examples.

Graph 80 is a graph of various relationships between employee A, employee B and employee C. Graph 80 is an example of a graph generated using a force-based algorithm in which the employees are represented as nodes and relationships between the employees are represented as edges. In graph 80, each employee has an edge connecting its respective node to a node representing Fact 3. This reflects the fact that for Fact 3 there is a reference to employees A to C. As described above, the database server 16 favors entries in link strength table 74 that have a large value of internal link strength 75 for facilitating identification of a connection between the employee and confidential information within the organization. As also discussed above, the server 16 can use the details with respect to the employees as stored in the database. Furthermore, in force-based algorithms, each node and edge are modeled as being subject to various physical laws. For example, each edge can be thought of as a spring subject to Hooke's law and each vertex can be thought of as a charge subject to Coulomb's law although other physical laws may be used in drawing a graph. By calibrating the parameters of the graph to known data (e.g., using appropriate values of charges and spring constants), a force-based algorithm can draw a graph which, in equilibrium, accurately represents the "closeness" of employees.

Next, graph 90 shows these relationships but with employee A's brother D who has been convicted of fraud connected to A. As discussed above, the database server 16 favors entries in link strength table 74 that have a large value of external link strength 76 for detecting an association between the employee and the occurrence indicative of risk. By incorporating this information into the initial graph 80 the risk of information leakage can be better determined.

Along these lines, suppose that each employee is part of the same organization with employee C being a senior employee associated with confidential information. It should be understood from the foregoing that the server 16 can obtain this information from the database 28. Fact 3 represents a particular instance of a dinner meeting. The employees A to C were all at the meeting even though there is was no reference in the e-mails or calendars of A and B that all three were at the meeting. If Facts 2 and 3 as described earlier were identified they would not link the three employees. Furthermore, it should be understood that the relationship between brother D and employee C who is a senior employee with access to confidential information may be considered inappropriate. This potential conflict would not be spotted by simply considering the e-mails, calendars, expense reports and the like. The link between employee C and individual D can be clearly seen in FIG. 5 (b).

It should be understood that the processor can determine the risk of information leakage by comparing a minimum distance between nodes representing individuals to a distance threshold. If the minimum distance is less than the distance threshold then the risk of information leakage is extremely high. It will be appreciated that the distance between the nodes can depend of the closeness of the individual relationships, the severity of the occurrence indicative of risk, the importance of the confidential information and the like.

Graph 92 is similar to the graph 90 with the exception that the individual D is also connected to the Fact 3. For example, if the expense report 36c as described with respect to FIG. 3 also referred to individual D then it would be appreciated that D would also be connected to the fact by virtue of also attending the dinner meeting. This would represent an even greater risk of information leakage.

Graph 94 is similar to the graph 90 with the exception that the individual D is far from employee A. For example, if the public record 36d as described with respect to FIG. 3 referred to individual D being convicted of a speeding offence then the risk would be far less.

Figure 6:
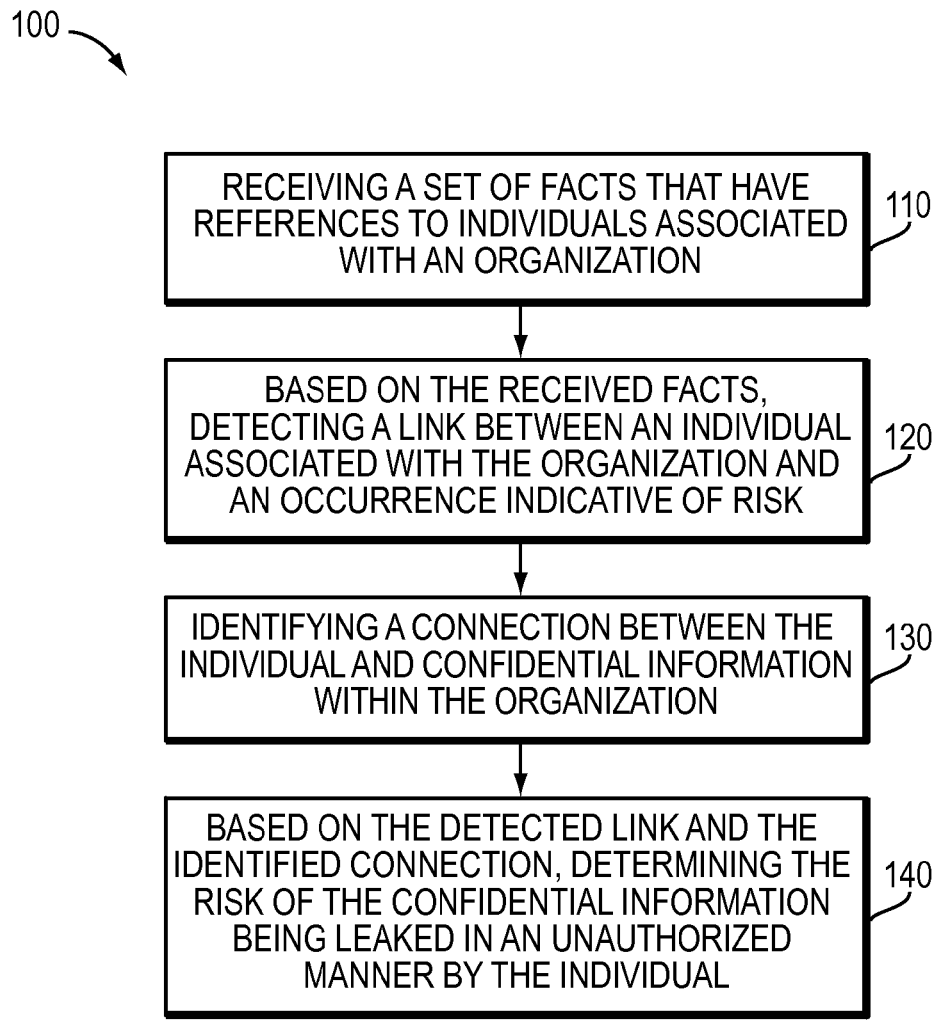
FIG. 6 is a flow chart illustrating a method of carrying out the technique within the electronic environment shown in FIG. 1.

Referring to FIG. 6, there is illustrated a method 100 for use in assessing the risk of information leakage. In step 110, the method comprises receiving a set of facts that have references to individuals associated with an organization. In step 120, the method comprises detecting a link between an individual associated with the organization and an occurrence indicative of risk based on the received facts. In step 130, the method comprises identifying a connection between the individual and confidential information within the organization. In step 140, the method comprises determining the risk of the confidential information being leaked in an unauthorized manner by the individual based on the detected link and the identified connection.

While various embodiments of the invention have been particularly shown and described, it will be understood by those skilled in the art that various changes in form and details may be made therein without departing from the spirit and scope of the invention as defined by the appended claims.

In some arrangements, the risk assessment system is implemented by a set of processors or other types of control/processing circuitry running software. In such arrangements, the software instructions can be delivered, within the system 12, to adaptors 14a, 14b, 14c and 14d in the form of a computer program product 120a, 120b, 120c and 120d respectively (see FIG. 2a), as well as to database server 16 in the form of a computer program product 130, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A computer-implemented method for use in assessing the risk of information leakage, the method comprising:
   receiving a set of facts, wherein the set of facts comprise at least one fact relating to public record and at least one fact relating to an organization;
   based on the received at least one fact relating to public record, detecting a link between an individual associated with the organization and an occurrence indicative of risk;
   based on the received at least one fact relating to the organization, identifying a connection between the individual and confidential information within the organization; and
   based on the detected link and the identified connection, determining the risk of the confidential information being leaked in an unauthorized manner by the individual.

2. The method as claimed in claim 1, wherein receiving from a plurality of fact sources the set of facts that have references to individuals associated with the organization.

3. The method as claimed in claim 2, wherein at least one fact source comprises a public record source with a fact having a reference to the occurrence indicative of risk.

4. The method as claimed in claim 3, wherein the occurrence indicative of risk relates to risky behaviour linked to the individual.

5. The method as claimed in claim 4, wherein the occurrence indicative of risk is linked to the individual by virtue of the risky behaviour being associated with a relative of the individual.

6. The method as claimed in claim 1, wherein identifying a connection between the individual and confidential information within the organization comprises identifying at least one of a level of seniority of the individual within the organization and an organizational group associated with the individual.

7. A risk assessment system constructed and arranged to assess the risk of information leakage, the system comprising:
 a network interface;
 memory; and
 a controller including controlling circuitry, the controlling circuitry being constructed and arranged to:
  receive a set of facts, wherein the set of facts comprise at least one fact relating to public record and at least one fact relating to an organization;
  based on the received at least one fact relating to public record, detect a link between an individual associated with the organization and an occurrence indicative of risk;
  based on the received at least one fact relating to the organization, identify a connection between the individual and confidential information within the organization; and
  based on the detected link and the identified connection, determine the risk of the confidential information being leaked in an unauthorized manner by the individual.

8. The system as claimed in claim 7, wherein receiving from a plurality of fact sources the set of facts that have references to individuals associated with the organization.

9. The system as claimed in claim 8, wherein at least one fact source comprises a public record source with a fact having a reference to the occurrence indicative of risk.

10. The system as claimed in claim 9, wherein the occurrence indicative of risk relates to risky behaviour linked to the individual.

11. The system as claimed in claim 10, wherein the occurrence indicative of risk is linked to the individual by virtue of the risky behaviour being associated with a relative of the individual.

12. The system as claimed in claim 7, wherein identifying a connection between the individual and confidential information within the organization comprises identifying at least one of a level of seniority of the individual within the organization and an organizational group associated with the individual.

13. A computer program product having a non-transitory, computer-readable storage medium which stores code to assess the risk of information leakage, the code including instructions to:
 receive a set of facts, wherein the set of facts comprise at least one fact relating to public record and at least one fact relating to an organization;
 based on the received at least one fact relating to public record, detect a link between an individual associated with the organization and an occurrence indicative of risk;
 based on the received at least one fact relating to the organization, identify a connection between the individual and confidential information within the organization; and
 based on the detected link and the identified connection, determine the risk of the confidential information being leaked in an unauthorized manner by the individual.

14. The product as claimed in claim 13, wherein receiving from a plurality of fact sources the set of facts that have references to individuals associated with the organization.

15. The product as claimed in claim 14, wherein at least one fact source comprises a public record source with a fact having a reference to the occurrence indicative of risk.

16. The product as claimed in claim 15, wherein the occurrence indicative of risk relates to risky behaviour linked to the individual.

17. The product as claimed in claim 16, wherein the occurrence indicative of risk is linked to the individual by virtue of the risky behaviour being associated with a relative of the individual.

18. The product as claimed in claim 13, wherein identifying a connection between the individual and confidential information within the organization comprises identifying at least one of a level of seniority of the individual within the organization and an organizational group associated with the individual.

* * * * *